(No Model.) 2 Sheets—Sheet 1.

G. C. SNYDER.
AUTOMATIC CANDY SHAPING MACHINE.

No. 347,971. Patented Aug. 24, 1886.

WITNESSES:
Theo. G. Hoster
C. Sedgwick

INVENTOR:
G. C. Snyder
BY Munn & Co
ATTORNEYS.

N. PETERS, Photo-Lithographer, Washington, D. C.

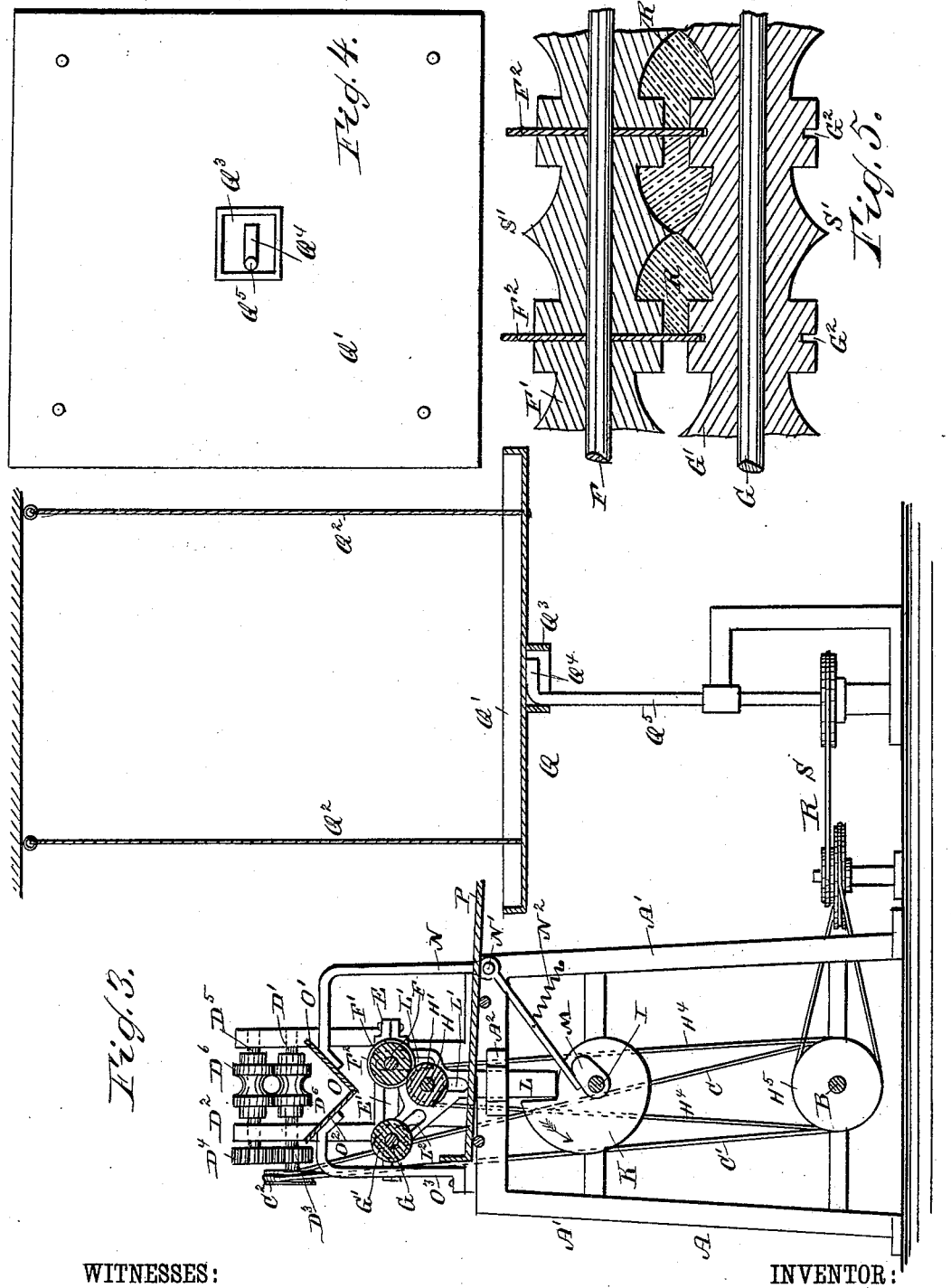

UNITED STATES PATENT OFFICE.

GUSTAVUS C. SNYDER, OF NEW YORK, N. Y.

AUTOMATIC CANDY-SHAPING MACHINE.

SPECIFICATION forming part of Letters Patent No. 347,971, dated August 24, 1886.

Application filed May 19, 1886. Serial No. 202,658. (No model.)

*To all whom it may concern:*

Be it known that I, GUSTAVUS C. SNYDER, of the city, county, and State of New York, have invented a new and Improved Automatic Candy-Shaping Machine, of which the following is a full, clear, and exact description.

The object of my invention is to provide a new and improved automatic machine for shaping candy into any desired form.

The invention consists of a sizing device; of a series of interchangeable rollers, of which one is provided with rotary cutters; of a device for automatically opening and closing the hopper and the series of rollers, and of a device for keeping the candy in motion after it leaves the shaping device until it has cooled off.

The invention also consists in various parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 2:
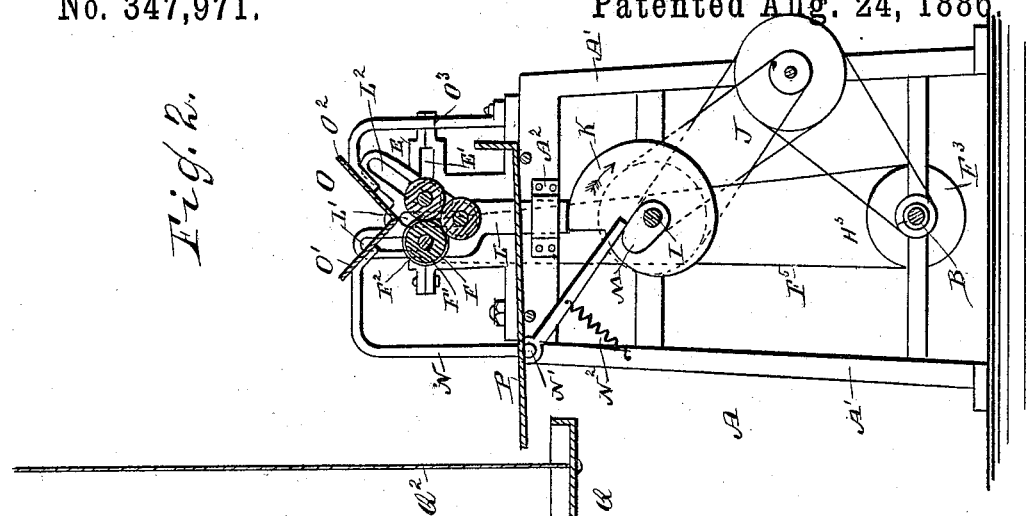
Figure 1:
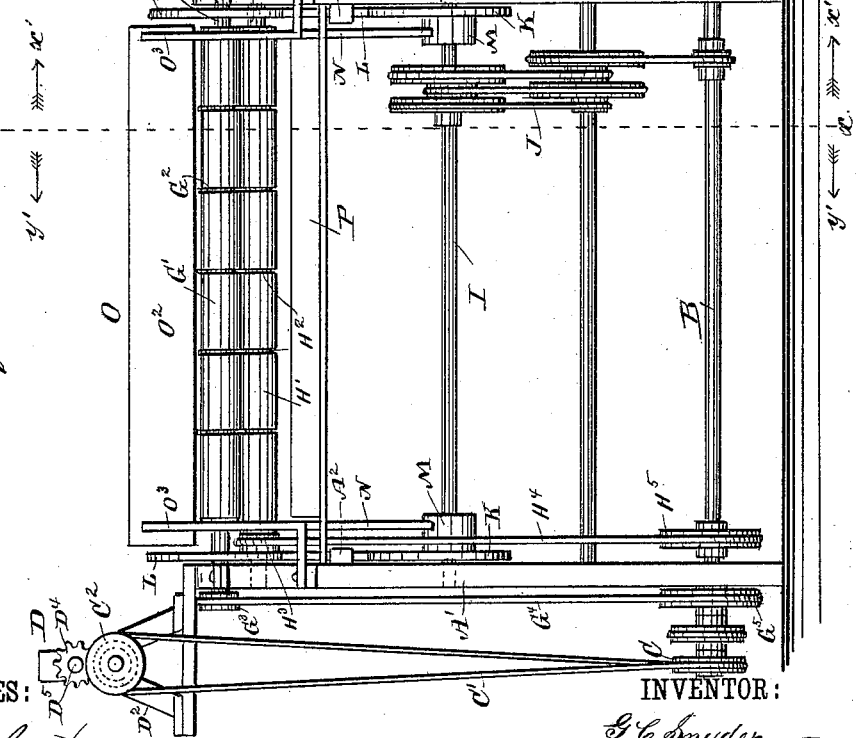

Figure 1 is a side elevation of my improvement. Fig. 2 is a transverse vertical section of the same on the line $x\ x$, Fig. 1, looking in the direction of the arrows $x'\ x'$. Fig. 3 is a similar view of the same on the line $x\ x$, Fig. 1, looking in the direction of the arrows $y'\ y'$. Fig. 4 is a bottom view of the shaking device. Fig. 5 is a sectional plan view of two shaping-rollers of a modified form.

On a suitable frame, A, is mounted the main driving-shaft B, carrying the driving-pulleys B', and provided with a grooved pulley, C, which is connected by a belt, C', with a pulley, $C^2$, operating the sizing device D, which is provided with a shaft, D', to which is secured the said grooved pulley $C^2$, and which shaft is mounted on a frame, $D^2$, attached to the main frame A. To the shaft D' is secured a gear-wheel, $D^3$, which meshes into the gear-wheel $D^4$, secured to the shaft $D^5$, mounted on the frame $D^2$ directly above the shaft D'. Each of the shafts D' and $D^5$ is provided with a grooved roller, $D^6$, between the grooves of which passes the hot candy, which is given a cylindrical form by the said grooved rollers $D^6$.

The upper ends of the standards A' of the main frame A are provided with detachable lids E, which, in conjunction with the upper ends of the standards A', form bearings for the shaft F, carrying the roller or rollers F', provided at suitable intervals with rotary cutters $F^2$, the shaft F being rotated from the main shaft B by the pulleys $F^3$ and $F^4$ and the belt $F^5$.

A shaft, G, carrying a roller or rollers, G', having at suitable intervals annular grooves $G^2$, is mounted to rotate in boxes sliding in the recesses E', formed between the lids E and the upper ends of the standards A'. The shaft G is provided with a pulley, $G^3$, which is connected by a belt, $G^4$, with the pulley $G^5$, secured to the main driving-shaft B.

Centrally below the shafts F and G the shaft H, carrying the roller or rollers H', having annular recesses $H^2$, is mounted to rotate in suitable bearings in the standards A', and is provided with a pulley, $H^3$, which is connected by a belt, $H^4$, with a pulley, $H^5$, attached to the main driving-shaft B.

A slow rotary motion is given to a shaft, I, placed centrally below the shaft H, and mounted in suitable bearings in the standards A', from the main driving-shaft B by means of a train of gear-wheels, or by pulleys and belts J, of suitable construction and arrangement. The shaft I is provided near the inside of each standard A' with a cam, K, which operates a vertically-sliding arm, L, having its bearings partly in the keeper $A^2$, attached to the main frame A, and partly on the shafts F and H, which pass through the vertical slots L', formed in the arm L. The shaft G passes through an inclined slot, $L^2$, formed in the arm L. A second smaller cam, M, is placed on the shaft I, near each of the cams K, and each cam M operates the lower arm of a bent lever, N, pivoted at N' to one of the standards A', the upper arm of said lever N being attached to one side, O', of the hopper, O. A spring, $N^2$, holds the lower end of the lever N in contact with the cam M. The hopper O is also provided with the stationary side $O^2$, which is supported by the brackets $O^3$, attached to the standards A'.

A chute, P, is placed between the standards A', directly below the rollers F, G, and H, and opens at its lower end upon the shaking device Q, which consists of a platform, Q', suspended by cords or wires Q², attached to the ceiling or other support, and provided in the middle of its under side with a square box, Q³, in which revolves a bent arm, Q⁴, attached to the vertical shaft Q⁵, which receives a slow rotary motion from the main driving-shaft B by a train of gear-wheels, or by belts and pulleys S.

The operation is as follows: The machine is set in motion by imparting a rotary motion to the main driving-shaft B, which rotates the sizing device D, the shafts F, G, and H, and the cams K and M, and operates the shaking device Q. A lump or mass of candy, which is hot and very pliable, is fed between the sizing-rollers D⁶, which give the candy a cylindrical shape and deliver it to the closed hopper O, the side O' of which opens at a certain time by the action of the lever N and the cam M, whereby the cylindrical roll of candy drops upon the rollers F', G', and H', of which the roller G' is advanced toward the rollers F' and H' by the action of the cam K, which is at this time pushing the arm L upward, and thereby causing the roller G' to move inward as the shaft G passes through the inclined slot L² in the side of the arm L, the rotation of the rollers F' and G' shaping the candy to their respective forms, while the roller H' assists and at the same time supports the candy. As soon as the cam K has reached its uppermost position, as shown in Fig. 2, then the roller G' is in close contact with the rollers F' and H', so that the rotary knives F² enter the annular grooves G² and H², and also cut the cylindrical stick of candy into as many pieces as there are rotary knives F². The further motion of the cam K causes the arm L to drop into the position shown in Fig. 3, whereby the roller G' is moved away from the rollers F' and H' by means of the shaft G passing through the inclined slot L² of the said arm. The bearing-boxes in which the shaft G rotates slide in the recesses E', formed between the lid E and the upper ends of the standards A'. The shaped candy drops from the rollers F', G', and H' upon the chute P, from which it rolls down upon the shaking platform Q', on which it is kept in constant motion by the action of the revolving arm Q⁴, striking alternately against each of the four sides of the square box Q³. When the candy becomes cooled, it is hard and can be removed from the platform Q'.

Any desired shape may be given to the candy, after it has been formed into a cylindrical roll by the sizing device D, by means of the rollers F' and G', which have to correspond with each other. The plain cylindrical rollers shown in Fig. 1 form the candy into sticks of a length equal to the distance between two cutters, F²; but the form of the rollers may be varied, as shown, for instance, in 5, into rollers having such a shape as to produce the candy R. The annular sharp edges of these rollers cut the candy at one place, and the cutters F² make a second cut in the candy. The cutters F² may be fastened to the shaft F or to the rollers themselves.

Having thus fully described my invention, I claim as new and desire to secure by Letters Patent—

1. In a candy-shaping machine, a rotating roller provided at suitable intervals with rotary knives and a rotating roller having annular recesses, in combination with a roller having annular recesses and mounted to rotate in boxes which slide laterally, substantially as shown and described.

2. In a candy-shaping machine, a rotating roller provided at suitable intervals with rotary knives, a rotating roller having annular recesses, and a laterally-sliding roller, in combination with an automatically opening and closing hopper, substantially as shown and described.

3. In a candy-shaping machine, a rotating roller provided at suitable intervals with rotary knives, a rotating roller having annular recesses, and a laterally-sliding roller having annular recesses, in combination with a sizing device and an automatically opening and closing hopper, substantially as shown and described.

4. In a candy-shaping machine, a rotating roller provided at suitable intervals with rotary knives, a rotating roller having annular recesses, and a laterally-sliding roller having annular recesses, in combination with a sizing device, an automatically opening and closing hopper, and a rocking platform, substantially as shown and described.

5. In a candy-shaping machine, a rotating roller provided at suitable intervals with rotary knives and a rotating roller having annular recesses, both rollers being rotated from the main driving-shaft, in combination with a roller having annular recesses, vertically-sliding arms, each having an inclined slot, through which passes the shaft of the said roller, and cams operating the said arms and attached to a shaft operated from the main shaft, substantially as shown and described.

6. In a candy-shaping machine, the rollers D⁶ of the sizing device, the hopper O, the shafts F, G, and H, the rollers F', G', and H', and the rotary knives F², in combination with the shaft I, the cams K and M, the vertically-sliding arm L, having the vertical slots L' and the inclined slot L², the bent lever N, attached to one side of the hopper O, and the spring N², substantially as shown and described.

7. In a candy-shaping machine, the platform Q', the square box Q³, and the cords or wires Q², in combination with the rotating shaft Q⁵ and the bent arm Q⁴, substantially as shown and described.

8. In a candy-shaping machine, the shafts F, G, and H, the rollers F', G', and H', and the rotary cutters F², in combination with the vertically-sliding arm L, having the vertical slots L' and the inclined slot L², and the cams K, mounted on the slowly-rotating shaft I, substantially as shown and described.

9. In a candy-shaping machine, the shafts F, G, and H, the rollers F', G', and H', and the rotary knives F², in combination with the vertically-sliding arms L, having the vertical slots L' and the inclined slots L², the cams K, mounted on the slowly-rotating shaft I, the pulleys F³ and F⁴, G³ and G⁵, and H³ and H⁵, and the belts F⁵, G⁴, and H⁴, substantially as shown and described.

GUSTAVUS C. SNYDER.

Witnesses:
 THEO. G. HOSTER,
 EDGAR TATE.